United States Patent [19]

Peterson et al.

[11] 4,452,765
[45] Jun. 5, 1984

[54] METHOD FOR REMOVING SULFUR OXIDES FROM A HOT GAS

[75] Inventors: Morris W. Peterson; Thomas B. Hurst, both of Medina, Ohio

[73] Assignee: The Babcock & Wilcox Company, New Orleans, La.

[21] Appl. No.: 173,784

[22] Filed: Jul. 30, 1980

[51] Int. Cl.$^3$ ............................................. C01B 17/00
[52] U.S. Cl. ..................................... 423/242; 423/244
[58] Field of Search .......... 423/242 A, 242 R, 244 A, 423/244 R; 55/73

[56] References Cited

U.S. PATENT DOCUMENTS 3,932,587  1/1976  Grantham et al. .................. 423/242

OTHER PUBLICATIONS

Dry SO$_2$ and Particulate Removal System Wheelabrator, Frye/Rockwell Intermational, 1978.

*Primary Examiner*—Gregory A. Heller
*Attorney, Agent, or Firm*—R. J. Edwards; K. W. Iles

[57] ABSTRACT

An improved method for removing sulfur oxides from a hot gas by introducing the gas into a first compartment of a spray drying reactor chamber for settleable particulate removal, by then directing the gas to a second compartment of the reactor chamber wherein the gas is contacted with an atomized alkali slurry for sulfur oxide removal by formation of a dry mixture of sulfite and sulfate compounds, by removing a portion of the dry mixture from the gas in the second compartment and by passing the gas from the second compartment to a dry particle collection zone for removal of substantially all of the remaining gas entrained dry mixture.

2 Claims, 5 Drawing Figures

METHOD FOR REMOVING SULFUR OXIDES FROM A HOT GAS

BACKGROUND OF THE INVENTION

The present invention relates to a method of removing sulfur oxides from a hot gas, and, more particularly, to the removal of sulfur oxides from a hot sulfur-bearing flue gas formed during the combustion of fossil fuels, especially oil and sulfur-bearing coal which are burned at electric power generating plants.

During the combustion of oil and sulfur-bearing coal, various combustion off-gases are produced which contain a variety of contaminants such as sulfur dioxide, sulfur trioxide and flyash. Combustion exhaust gases containing sulfur dioxide present a serious air pollution problem, and, as a result, federal and state air pollution control agencies have promulgated regulations to control the levels of sulfur dioxide released to the atmosphere. Accordingly, many processes have been developed in an effort to meet air pollution emission control standards by effectively controlling the levels of sulfur dioxide emissions generated during fossil fuel combustion.

One approach used for controlling sulfur dioxide from combustion exhaust gases has been to improve the quality of fuel by reducing its sulfur content prior to combustion. Another approach has been to locate and utilize fossil fuels with a low sulfur-bearing content. Still another approach has been to mix a dry alkali compound with a fossil fuel and inject the mixture into the combustion zone.

Combustion exhaust gases have also been treated by a variety of wet absorption processes in an attempt to control sulfur dioxide emissions. Wet absorption processes have been found suitable for treating relatively low temperature flue gases wherein the gas is typically washed with an aqueous alkaline solution or slurry. Wet absorption processes, while useful, have several disadvantages, namely, they have a mist carryover problem which permits moisture to be emitted to the atmosphere in relatively large quantities; they require gas reheat to control atmospheric moisture discharge; they liberate particulate matter contained in the mist during atmospheric mist evaporation; they present a sludge disposal problem in that collected alkali-sulfur reacted materials must either be separated from the liquid in a settling pond or in a de-watering system prior to disposal; and they do not readily lend themselves to regeneration of alkali for use in additional gas treatment.

Many attempts have been made to add alkali in a dry pulverized form directly to combustion exhaust gases to control sulfur dioxide emissions but to date the results have not been found to be commercially acceptable. In such processes, sulfur dioxide is generally removed either by chemical absorption or adsorption followed by oxidation. The disadvantages of adding dry alkali directly to exhaust gases are that reaction time between the alkali and gases is relatively slow and inefficient and reaction by-products are not readily regenerated for the recapture of desirable constituents.

The object of the present invention is to provide an improved method for removing sulfur oxides from a hot gas. The most pertinent existing prior art relating to the removal of sulfur oxides from hot gases is disclosed in U.S. Pat. No. 4,197,278. In this art reference, sulfur oxide control is accomplished by introducing a hot gas in a single compartment spray-drying zone while simultaneously introducing a gas contacting aqueous reactive absorbent and then contacting the gas with the absorbent in a second fabric filter zone. The gas is introduced at the top and removed from the bottom of the spray-drying compartment. The aqueous gas contacting absorbent is introduced and dispersed in the spray-drying zone by directing the absorbent to inpinge upon the surface of a horizontally rotating disc.

The present invention introduces the hot untreated gas into a multiple compartment spray drying reactor chamber. Gas velocity is effectively controlled, settleable entrained particles are removed and thereby not unnecessarily contacted and treated with an atomized alkali slurry and the gas is uniformly introduced and dispersed throughout a spray drying compartment of the reactor chamber. The present invention eliminates the prior art rotating disc and effectively utilizes a series of nozzles which introduce a finely atomized alkali slurry that provides intimate contact with the gas in the spray drying compartment. The costly power source necessary to impart rotation of the prior art disc is thereby eliminated, thus rendering the present system more economical. Additionally, the nozzles provide a more highly dispersed and evenly distributed alkali spray, eliminate the presence of large liquid droplets inherent in the use of a rotating disc, and assure a more intimate gas-alkali contact, thereby providing a more efficient gas treatment proces.

SUMMARY OF THE INVENTION

The present invention relates to an improved method for removing sulfur oxides from a hot gas. The hot gas above a predetermined temperature is conveyed to a first compartment of a spray drying reactor chamber. In the first compartment, settleable particulate matter is removed from the gas. The gas is directed in the first compartment to a register assembly having at least one port communicating with a second compartment and a nozzle discharging through the port. The gas is passed in a swirling motion about the nozzle and through the port and into the second compartment. An alkali slurry and an atomizing fluid is introduced into the nozzle for mixing therein to atomize the slurry. The atomized slurry is discharged into the second compartment for contact with the gas while maintaining the gas at a predetermined temperature to form a dry mixture of sulfite and sulfate compounds. At least a portion of the dry mixture is separated from the gas and removed from the second compartment. The gas is then conveyed and discharged from the second compartment to a dry particle collection zone for removal of substantially all of the remaining gas entrained dry mixture.

The various features of novelty which characterize the invention are pointed out with particularity in the claims annexed to and forming a part of this disclosure. For a better understanding of the invention, its operating advantages and specific results obtained by its use, reference should be made to the accompanying drawings and descriptive matter in which there is illustrated and described a typical embodiment of the invention.

BRIEF DESCRIPTION OF THE DRAWINGS

FIG. 4 is a detailed sectional view of a register assembly depicted in FIG. 3.

DETAILED DESCRIPTION OF THE PREFERRED EMBODIMENT

Figure 1:
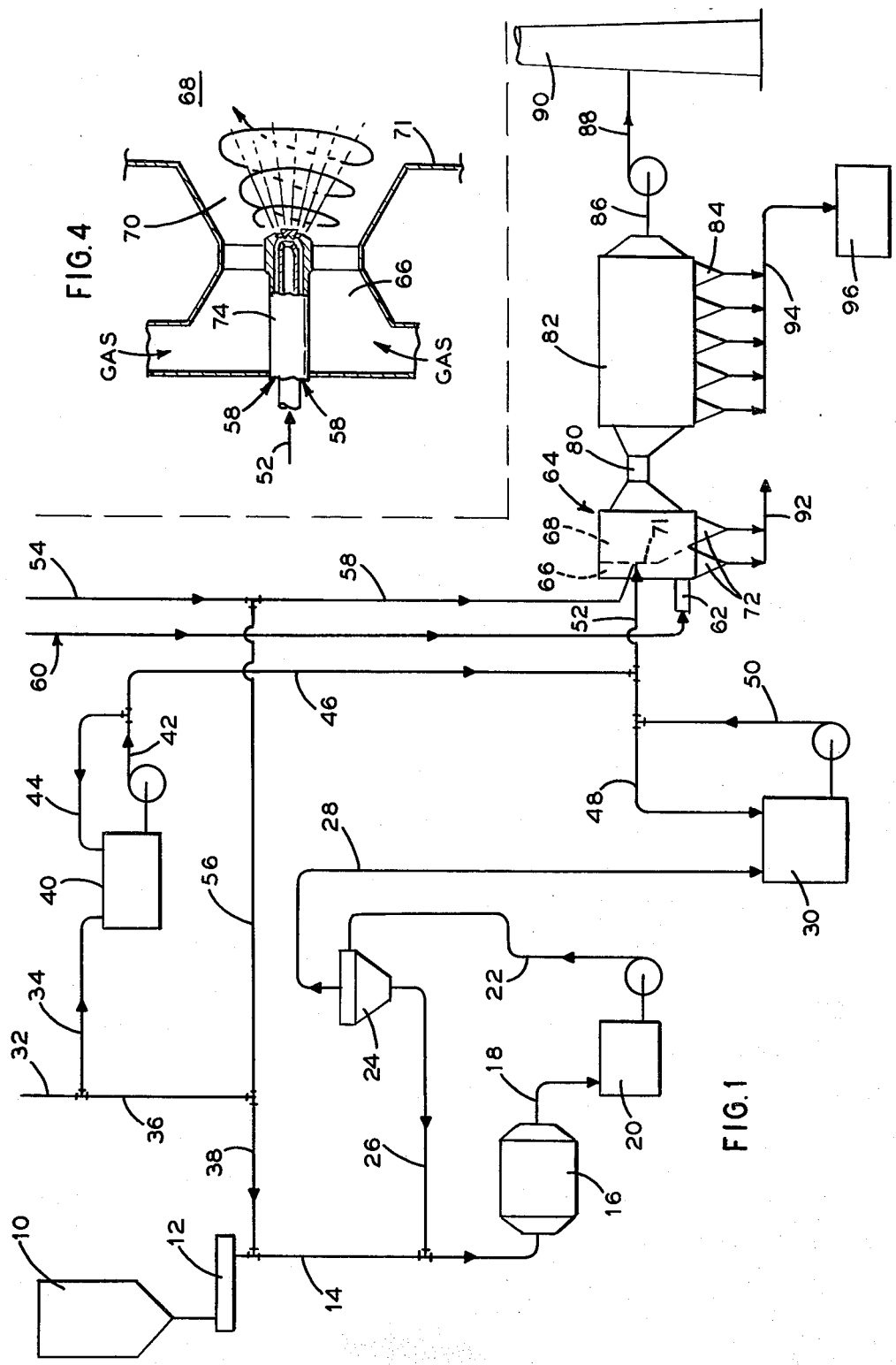
FIG. 1 is a schematic elevation view of the gas treatment process embodying the invention.

Referring to FIG. 1, there is illustrated a schematic representation characterizing an embodiment of the invention wherein sulfur oxides are removed from a hot gas. An alkali absorbent such as calcium oxide, calcium hydroxide, sodium hydroxide, or the like, the preferred absorbent being calcium oxide, is stored in silo 10 and fed via a gravimetric feeder 12 to conduit 14 which also receives a small constant flow of water delivered to conduit 14 through conduit 38. The alkali-water mixture is conveyed through conduit 14 and is introduced to a mill slaker 16 wherein the mixture is pulverized. The pulverized mixture is discharged from slaker 16 and conveyed via conduit 18 to a mill product tank 20. The mixture is pumped from mill product tank 20 and transported through conduit 22 to a classifier 24. In classifier 24, material of the proper fineness is separated from the bulk quantity delivered and is then conveyed by conduit 28 to an alkali slurry feed tank 30. Oversized material is removed from classifier 24 and returned to slaker mill 16 via transport line 26 for further grinding.

Slaker 16 operation is controlled to automatically stop and start as prepared alkali slurry is used during gas treatment. The quantity of slurry in slurry feed tank 30 is used to control the operation of the milling system. A nuclear density meter, not shown, is used to monitor the milling system product. The density of the slurry is an important consideration in the overall performance of the gas treatment system and it is continuously monitored to regulate the flow of recycle make-up water to the system.

Slurry make-up water is delivered to the system through line 32 from a water source, not shown. The water is then conveyed to a water softening tank 40 by pipeline 34. A portion of the water is fed via pipeline 36 to conduit 38 for delivery to mill slaker 16. Softened water is pumped from tank 40 through conduits designated 42, 46 and 48 and delivered to slurry feed tank 30. A portion of the softened water pumped from tank 40 can be returned via pipeline 44 to tank 40 for further treatment. The alkali slurry is pumped from slurry feed tank 30 through conduit 50 to conduit 52 for delivery to a spray drying reactor chamber 64. Alternatively, the slurry can be pumped to conduit 48 and recycled to slurry feed tank 30 during reactor chamber shutdown.

Hot flue gas derived from the combustion of oil and sulfur-bearing coal and containing sulfur oxides is conveyed from a combustion zone, not shown, through conduit 60 and delivered to spray drying reactor chamber 64 through an inlet 62 located near the lower portion of a first compartment 66 of spray drying reactor chamber 64. Steam or air supplied by a source not shown is conveyed by conduits 54 and 58 to spray drying reactor chamber 64. Steam from conduit 54 can be drawn off and conveyed via conduit 56 to heat the water entering the milling system during milling system start up.

Figure 2:
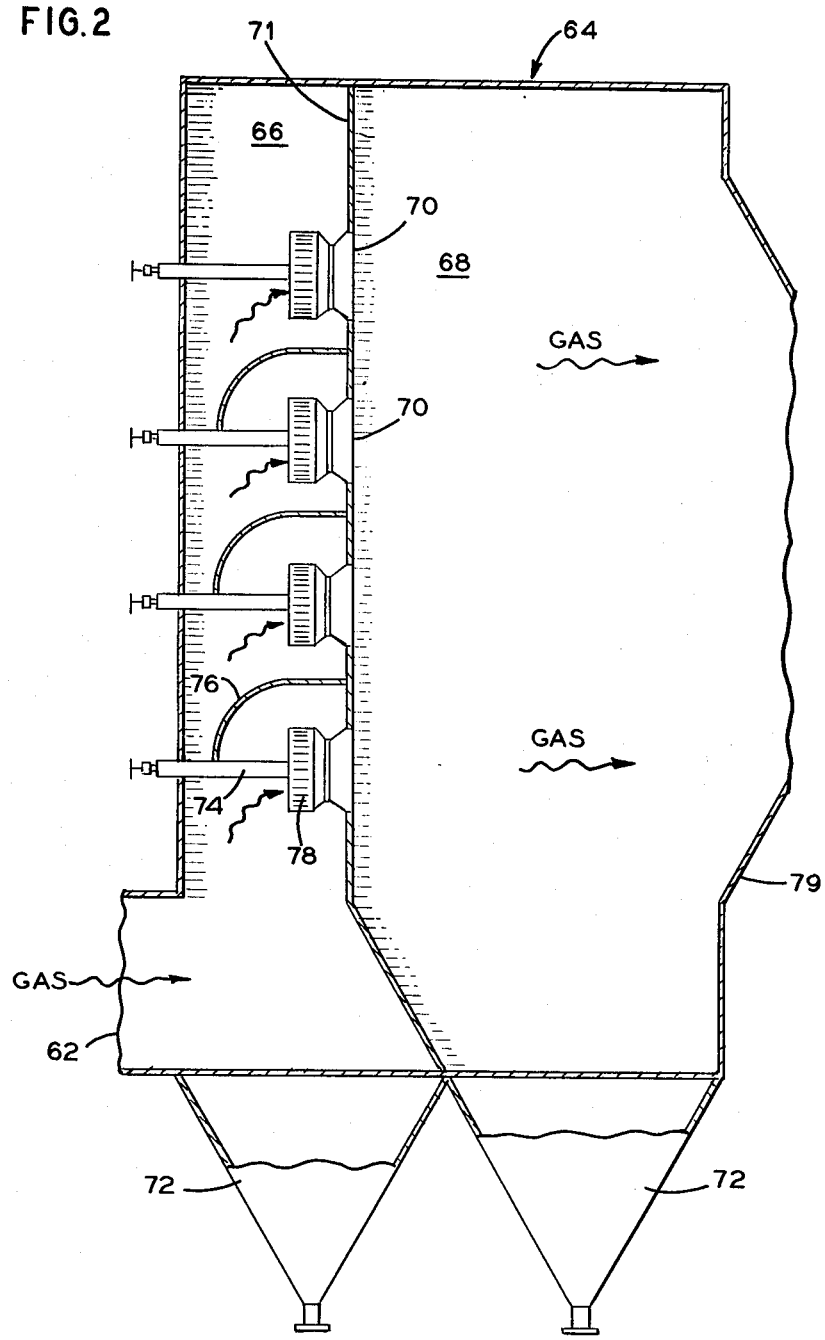
FIG. 2 is a sectional side elevation view of the spray drying reactor chamber shown in FIG. 1.
Figure 3:
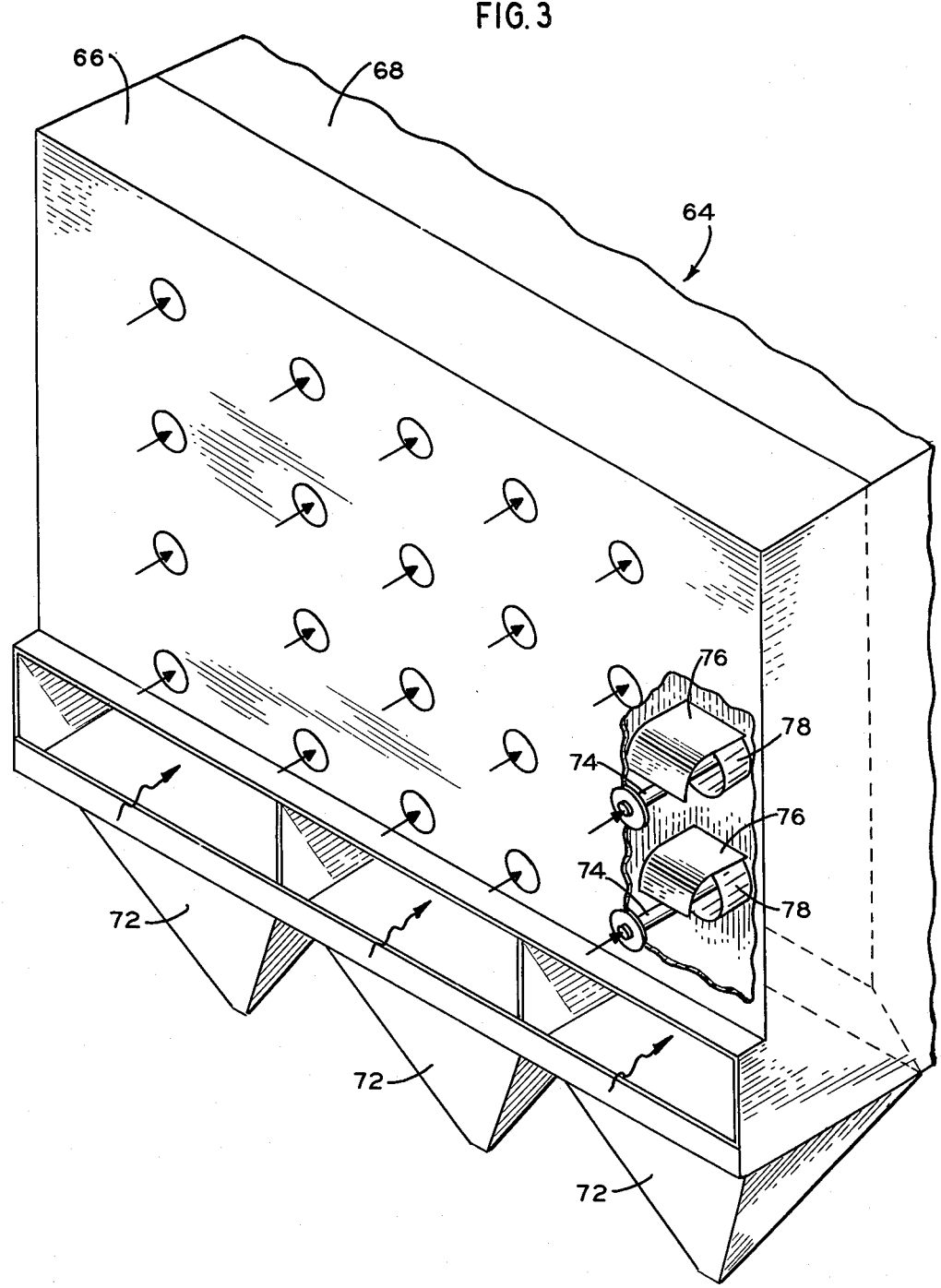
FIG. 3 is a sectional front perspective view of the spray drying reactor chamber shown in FIG. 1.

Referring to FIGS. 2 and 3, the hot flue gas entering the lower portion of compartment 66 is introduced at a temperature of at least 190° F. The gas entering compartment 66, also referred to as a plenum, loses some of its inlet velocity which allows settleable particulate matter to be removed by gravitational force for collection in ash hopper 72. The gas then moves upwardly and is dispersed uniformly throughout compartment 66 for delivery to a plurality of register assemblies 78 each having a port 70 communicating with a second compartment 68 of spray drying reactor chamber 64 and a nozzle 74 passing through partition 71 and discharging through port 70. Vane 76 is used to guide the gas to nozzle 74. Register assembly 78 imparts a swirling motion to the gas wherein the gas is swirled about nozzle 74 and discharged through port 70 and into compartment 68. FIGS. 2 and 3 illustrate a systematic arrangement of a plurality of register assemblies spaced throughout compartment 66 wherein each assembly receives a uniform delivery of the gas.

FIG. 4 depicts a detailed sectional view of register assembly 78. The alkali slurry is conveyed by conduit 52 to nozzle 74 for passage therethrough while an atomizing fluid of either steam or air is simultaneously conveyed by conduit 58 and passed through nozzle 74. Nozzle 74, typically a wear resistant y-jet dual media nozzle, is maintained in a substantially horizontal position. In nozzle 74, the slurry is mixed with and atomized by the atomizing fluid and a finely atomized alkali slurry is discharged from nozzle 74 through port 70 and into the second compartment 68 of reactor chamber 64 where the atomized alkali slurry is mixed and makes intimate contact with the gas which leaves first compartment 66 in a swirling motion about nozzle 74 and through port 70 and into second compartment 68.

The gas in second compartment 68 is controlled to maintain the gas at a temperature approximately 15° to 30° F. above its adiabatic saturation temperature. Gas temperature control is achieved by monitoring the gas flow temperature, by metering the gas flow and by metering slurry content water flow to spray drying reactor chamber 64 and regulating the quantity of inlet water delivered to produce the desired gas temperature in second compartment 68.

The amount of slurry feed required for gas treatment is determined from a stoichiometric feed rate calculation. The mole rate of sulfur dioxide contained in the gas is determined from the product of gas flow times the sulfur dioxide concentration of the gas delivered to reactor chamber 64, while the mole rate of alkali is determined from the slurry feed flow times the slurry density. A typical stoichiometric feed ratio ranges from 0.6 to 1.6 pound moles of calcium oxide to pound moles of sulfur dioxide entering second compartment 68.

Adjacent nozzles can spin the gas in opposite directions to increase atomized alkali slurry-gas contact. The end nozzles near the wall of compartment 66 spin in a direction so that the gas sweeps up along the face of the wall and the nozzles can be withdrawn from compartment 66 for required maintenance without shutting down the system.

Nozzle 74 discharges the atomized alkali slurry horizontally through port 70 and across second compartment 68 wherein the atomized slurry is evaporated before it reaches the gas outlet of second compartment 68. Slurry-gas contact in second compartment 68 forms a dry mixture of sulfite and sulfate compounds, a portion of which is removed from compartment 68 through gravitational settling into ash hopper 72 located at the bottom of chamber 68.

Returning to FIG. 1, gas leaves second compartment 68 at 79 and passes through a gas reheat zone 80 for gas reheat when required for corrosion control in dry particle collection zone 82 wherein dry particle collection is achieved utilizing an electrostatic precipitator, a fabric filter or the like. Substantially all of the remaining gas entrained dry mixture is removed from the gas in collection zone 82. The treated gas that leaves zone 82 through conduit 86 is substantially free of particulate matter and sulfur oxides. The gas is then pumped through conduit 88 to an exhaust stack 90 for atmospheric discharge.

Particulate matter collected in ash hoppers 72 is conveyed by conduit 92 for ultimate disposal. Reacted alkali particles and flyash that are collected in ash hoppers 84 in the dry particle collection zone 82 are conveyed by conduit 94 to reprocessing zone 96 for reprocessing and recycle.

The dry alkali and flyash materials conveyed to reprocessing zone 96 still contain some residual alkali that can be recovered and recycled for additional gas treatment and thereby reduce the quantity of fresh alkali required. Reprocessing and recycling can be accomplished by conveying the materials from zone 96 to mill slaker 16 for pulverizing and introduction into the alkali slurry system, by adding water to the materials in zone 96 and conveying this slurry to classifier 24 for further processing in the alkali slurry system, by adding water to the materials in zone 96 and conveying this slurry directly to slurry feed tank 30 or by any combination of these reprocessing and recycling methods.

Figure 5:
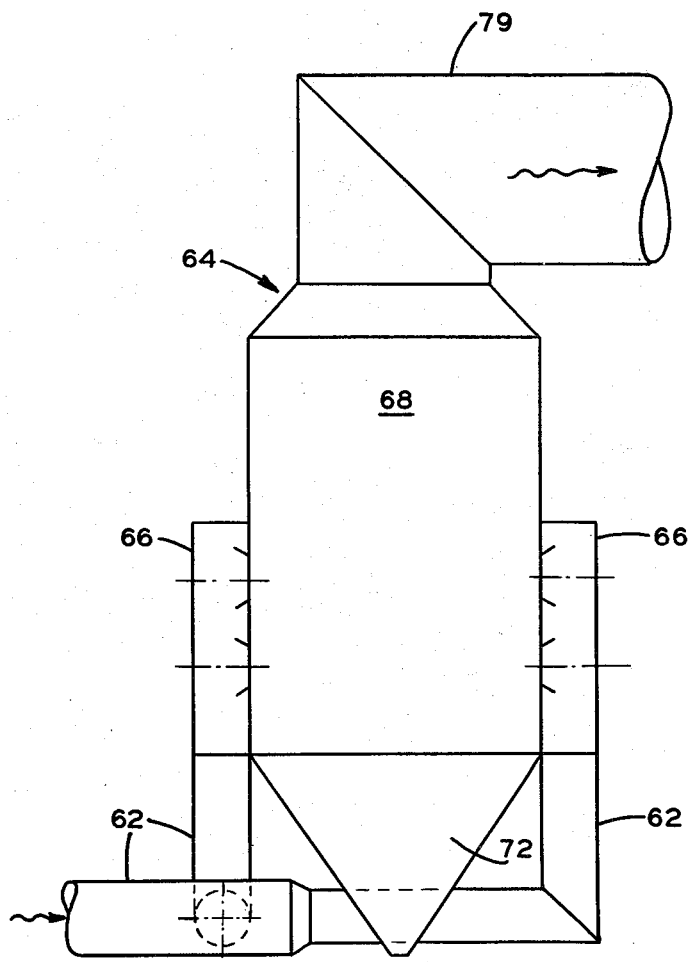
FIG. 5 is an alternate embodiment of the spray drying reactor chamber shown in FIG. 2.

FIG. 5 shows an alternate embodiment of spray drying reactor chamber 64 with other features being like those depicted in FIGS. 2 and 3. Alternatively, the untreated gas may enter first compartment 66 near the top or at some point between the top and bottom of the compartment.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without corresponding use of the other features.

The embodiments of the invention in which an exclusive property or privilege is claimed are defined as follows:

1. An improved method for removing sulfur oxides from a hot gas comprising the steps of:

conveying the hot gas above 190° F. to a first compartment of a spray drying reactor chamber wherein settleable particulate matter is removed;

directing the gas in the first compartment to a register assembly having at least one port communicating with a second compartment and a y-jet dual media nozzle horizontally disposed and discharging through the port;

passing the gas in a swirling motion about said nozzle and through said port and into the second compartment;

supplying an alkali slurry containing from 0.6 to 1.6 pound moles of alkali per pound moles of sulfur oxide in the gas and an atomizing fluid to the nozzle for mixing therein to atomize the slurry;

discharging the atomized slurry into the second compartment for contact with said gas while maintaining the gas at a predetermined temperature to form a dry mixture of sulfite and sulfate compounds and removing at least a portion thereof from said second compartment; and conveying and discharging the gas from said second compartment to a dry particle collection zone for removing substantially all of the remaining entrained dry mixture.

2. The method according to claim 1 wherein the gas in the second compartment is maintained at a temperature approximately 15° to 30° F. above its adiabatic saturation temperature.

* * * * *